United States Patent
Kuwayama et al.

(10) Patent No.: US 6,499,730 B1
(45) Date of Patent: *Dec. 31, 2002

(54) DYNAMIC DAMPER HAVING GENERALLY CYLINDRICAL SHAPE AND METHOD OF PRODUCING THE SAME

(75) Inventors: Naohito Kuwayama, Nagoya (JP); Hiroaki Tanahashi, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/595,119

(22) Filed: Jun. 16, 2000

(30) Foreign Application Priority Data

Mar. 30, 2000 (JP) ........................ 2000-094999

(51) Int. Cl.⁷ ................................. F16F 7/00
(52) U.S. Cl. ................ 267/141; 267/141.2; 188/379
(58) Field of Search ............... 267/141, 141.2, 267/141.3, 141.4, 141.5, 293, 153; 128/379

(56) References Cited

U.S. PATENT DOCUMENTS

| | | | |
|---|---|---|---|
| 1,775,403 A | 9/1930 | McLeod | 277/322 |
| 1,934,597 A | 11/1933 | Foppl | 74/574 |
| 3,319,918 A | 5/1967 | Rapata | 248/239 |
| 3,771,846 A | 11/1973 | Bass et al. | 308/238 |
| 3,893,775 A * | 7/1975 | Sievers et al. | 267/281 |
| 3,982,983 A * | 9/1976 | Abraham et al. | 156/556 |
| 4,158,407 A | 6/1979 | Rest | 206/318 |
| 4,223,565 A | 9/1980 | Sugiyama et al. | 74/574 |
| 5,056,763 A | 10/1991 | Hamada et al. | 267/141 |
| 5,090,668 A * | 2/1992 | Hamada | 267/141 |
| 5,135,204 A * | 8/1992 | Funahashi | 267/141.4 |
| 5,465,485 A * | 11/1995 | Miyake et al. | 29/892.11 |
| 5,516,376 A * | 5/1996 | Tsukamoto et al. | 148/586 |
| 5,593,144 A | 1/1997 | Hamada et al. | 267/141 |
| 5,660,256 A * | 8/1997 | Gallmeyer et al. | 188/379 |
| 5,671,909 A * | 9/1997 | Hamada et al. | 267/141 |
| 5,843,264 A * | 12/1998 | Mabuchi et al. | 156/245 |
| 6,098,436 A * | 8/2000 | Girardello et al. | 72/42 |

FOREIGN PATENT DOCUMENTS

| | | |
|---|---|---|
| EP | 0 356 917 A2 | 3/1990 |
| EP | 0 409 202 A1 | 1/1991 |
| EP | 0 409 704 A1 | 1/1991 |
| GB | 1040109 | 8/1966 |
| JP | 2-93155 | 4/1990 |
| JP | 2-129431 | 5/1990 |
| JP | 2-190641 | 7/1990 |
| JP | 2-31626 | 8/1990 |
| JP | 3-37450 | 2/1991 |
| JP | 4-140536 | 5/1992 |
| JP | 4-321420 | 11/1992 |
| JP | 5-44779 | 2/1993 |
| JP | 6-37915 | 5/1994 |
| JP | 8-28627 | 2/1996 |
| JP | 8-247213 A * | 9/1996 |
| JP | 10-132027 | 5/1998 |
| JP | 55130 * | 2/2000 |

* cited by examiner

Primary Examiner—Jack Lavinder
Assistant Examiner—Mariano Sy
(74) Attorney, Agent, or Firm—Rossi & Associates

(57) ABSTRACT

A dynamic dater mounted on a rod-shaped oscillating member is disclosed, which includes: a cylindrical mass member disposed radially outwardly of the oscillating member and formed of a metallic material by forging, while being subjected to a scale-removal treatment; an elastic support member for elastically supporting the metallic mass member for connection thereof with the oscillating member; and an elastic covering layer adapted to cover a substantially entire area of the surface of the metallic mass member and integrally formed with the elastic support member. The elastic covering layer is fixed in close contact with the substantially entire area of the outer surface of the mass member, so that the metallic mass member is firmly secured to the elastic support member without using an adhesive. A method of producing the dynamic damper is also disclosed.

9 Claims, 9 Drawing Sheets

DYNAMIC DAMPER HAVING GENERALLY CYLINDRICAL SHAPE AND METHOD OF PRODUCING THE SAME

BACKGROUND OF THE INVENTION

1. Field of the Invention

The present invention relates to a dynamic damper having a generally cylindrical shape, and installed on a hollow or a solid rod member which is subject to oscillation and which is a member of a vibration transmitting system such as shafts, arms, or conduits used in various devices, for reducing or absorbing vibrations of the oscillating rod member, and further relates to a method of producing the dynamic damper.

2. Description of the Related Art

Various kinds of rod members such as shafts or arms functioning as a power transmitting members and such as conduit or pipes serving as a fluid passage generally tend to oscillate or vibrate and consequently resonate due to an external oscillating force. Further, the rod member undesirably transmits a vibration excited therein to other components of a device in which the rod member is used. As a method to cope with these problems, a dynamic damper is attached to the rod member for preventing the resonance of the rod member and the transmission of the excited vibration of the rod member to the other components.

Examples of such a dynamic damper are disclosed in JP-A-2-190641, JP-B-6-037915, and JP-A-10-132027, wherein the dynamic damper has a mass member having a generally cylindrical configuration and an elastic support member secured to the mass member. The disclosed dynamic damper is installed onto an oscillating rod member and secured thereto at the elastic support member so that the mass member is elastically supported on the oscillating rod member via the elastic support member. The dynamic damper installed on the oscillating rod member as described above constitutes a secondary vibration system in which the mass member serves as a mass and the elastic support member serves as a spring, with respect to the oscillating rod member as a primary vibration system. The thus constructed dynamic damper is properly tuned so that the dynamic damper is capable of exhibiting effective damping characteristics with respect to a torsional or circumferential vibration as well as an axial and a radial vibration of the rod member. Since the mass member has the cylindrical shape, the mass member of the dynamic damper is not released from the rod member, even if the elastic support member is undesirably broken. In other words, the dynamic damper having the cylindrical mass member has a so-called "fail-safe" structure. For the above, the dynamic damper is considered to be installed on a drive shaft of an automotive vehicle for absorbing or reducing vibrations thereof, for example.

The conventional dynamic damper preferably comprises the mass member consisting of a cylindrical mass formed of a metallic material such as carbon steel, which is available at a relatively low cost and which has a relatively large mass and the elastic support member which is bonded to the cylindrical metallic mass member in the process of vulcanization of a rubber material for forming the elastic support member, with the mass coated by an adhesive material. The cylindrical metallic mass may be formed by casting a metallic material, by cutting a metallic piping member in a suitable length or by roll molding a metallic plate to form a cylindrical member.

However, the metallic mass prepared by casting has a low dimensional accuracy, resulting in difficulty in providing a desired mass of the metallic mass with high accuracy. Further, the metallic mass formed by casting suffers from a problem of difficulty in providing a desired high-specific gravity thereof and a problem of cumbersome manufacturing processes and post-treatments. On the other hand, the metallic mass formed of the metallic piping member by cutting in the suitable axial length, or the metallic mass formed of the metallic plate by pressing, e.g., by roll molding, may be produced with ease and with high-dimensional accuracy. However, such a metallic mass undesirably requires a significantly high-manufacturing cost due to the expensive piping member or undesirably required huge and expensive dies for the press.

In order to reduce the manufacturing cost of the dynamic damper, there is proposed to omit an adhesion treatment e.g., applying the adhesive between the elastic support member and the metallic mass. To this end, the dynamic damper may be modified to further comprise a rubber layer which is adapted to cover a substantially entire area of the outer surface of the metallic mass and integrally formed with the elastic support member, so that the elastic support member is fastened to the metallic mass without the above-indicated adhesion treatment. The thus constructed dynamic damper however, cannot provide resilient bonding strength between the elastic support member and the metallic mass, and it does not meet the requirements of the dynamic damper.

More specifically described, in the dynamic damper whose metallic mass and the elastic support member are not bonded together by means of the adhesive, the metallic mass and the elastic support members are likely to be displaced relative to each other at an interface therebetween, upon application of a relatively large vibrational load to the dynamic damper, leading to an undesirably introduction of the air into the interface between the metallic mass member and the elastic support member, resulting in deterioration of a vibration damping effect. The similar problem, that is the undesirable introduction of the air into the interface between the metallic mass and the elastic support member, may possibly occur, when the dynamic damper is installed on the oscillating rod member and a primary load in its axial direction is applied thereto, and when the dynamic damper is installed on a propeller shaft of the automobile vehicle and small pieces of rocks or curb stones collide with the dynamic damper, for example.

SUMMARY OF THE INVENTION

It is therefor a first object of this invention to provide a dynamic damper which has novel structure wherein a metallic mass member has a relatively high-specific gravity and is constructed with a high-dimensional accuracy, and wherein the metallic mass member and an elastic support member are fastened to each other with high strength. The dynamic damper also permits a desired damping effect with high stability and a reduced manufacturing cost.

It is therefore a second object of this invention to provide a method suitable for producing the dynamic damper having such a novel structure indicated above.

The first object may be achieved according to a first aspect of this invention which provides a dynamic damper mounted on a rod-shaped oscillating member, comprising: (a) a generally cylindrical mass member disposed radially outwardly of the oscillating member and comprising a cylindrical metallic mass which is formed b forging and which is subjected to a scale-removal treatment; (b) an elastic support member for elastically supporting the cylindrical metallic mass for connection thereof with the oscillating member; and (c) an elastic covering layer adapted to cover a substantially entire area of a surface of the cylindrical metallic mass and integrally formed with the elastic support member, the elastic covering layer being fixed in close contact with the substantially entire area of the surface of the cylindrical metallic mass so that the elastic support member is firmly secured to the cylindrical metallic mass without using an adhesive.

In the dynamic damper constructed according to the first aspect of the invention, the use of the cylindrical mass member in the form of the forged cylindrical metallic mass permits a higher dimensional accuracy and a higher specific gravity of the mass member, in comparison with the case where the mass member is formed of a metallic material by casting. In particular, the cylindrical metallic mass formed by forging has the surface rugged by the scale removal treatment. Therefore, the elastic covering layer covering the rugged surface of the cylindrical metallic mass is firmly secured to the metallic mass owing to a mechanical bonding strength caused by an engagement of the rugged surface of the metallic mass and the inner surface of the elastic covering layer which is rugged corresponding to the rugged surface of the forged metallic mass upon vulcanization of a rubber material to form the elastic covering layer, resulting in eliminating the adhesive treatment. It is appreciated that the scale removal treatment is generally performed on forgings so as to remove scales formed on the surface of the forgings, so that no specific operation or facility for the removal of the scale is required, effectively avoiding a rise in the manufacturing cost.

In the dynamic damper constructed according to the first aspect of the present invention, the cylindrical metallic mass can be formed with a desired size and a desired mass, by effectively utilizing characteristics of the forgings. The dynamic damper also makes it possible to assure sufficient bonding strength between the cylindrical metallic mass and the elastic support member, without requiring the conventionally performed adhesive treatment with respect to the metallic mass and the elastic support member, lowering the manufacturing cost.

The cylindrical metallic mass may be formed of various kinds of metallic materials, and may preferably be formed of ferrous metals, such as carbon steel, and the like, in view of their characteristics such as a relatively low cost, formability and sufficiently high specific gravity. The cylindrical metallic mass may possibly have a polygonal shape other than the cylindrical shape in its transverse cross section. In order to obtain a further improved mechanical bonding strength between the metallic mass member and the elastic covering layer, the cylindrical metallic mass may further be formed with recesses and protrusions, cutouts and/or through holes, which are covered or filled with the elastic covering layer. Moreover, the metallic mass member may be tapered at its inner and outer circumferential surface, for improving an efficiency of the forging operation.

Further, the cylindrical metallic mass may be formed by a suitable forging method such as a cold forging and a warm forming. Preferably, the cylindrical metallic mass may be formed by a hot forging, in the light of the required working cost and an excellent productivity of the hot forging. After the cylindrical metallic mass is formed by the above indicated forging methods, the scale removal treatment is performed in order to remove the scale, i.e., a thin layer of oxide generated on the surface of the metallic mass during a period of cooling or annealing of the metallic mass. This scale removal treatment may suitably be performed by a shot blasting method using steel shots or cut wires, for example. The surface of the cylindrical metallic mass member is made roughed or rugged by the scale removal treatment so that the surface of the metallic mass preferably has a ten-point means roughness Rz in a range from 30 $\mu$m to 200 $\mu$m, more preferably from 50 $\mu$m to 100 $\mu$m. Namely an excessively small Rz value of the surface roughness of the metallic mass member leads to difficulty in obtaining a sufficient bonding stability between the metallic mass member and the elastic covering layer, while an excessively large Rz value of the surface roughness of the metallic mass requires the relatively long-time shot-blasting operation, leading to an increase in a manufacturing cost of the dynamic damper.

In addition, the elastic support member and the elastic covering layer which are integrally formed with each other, may be made of any one of various kinds of rubber materials or a mixture thereof. For instance, a rubber material such as NR, SBR or BR, or a mixture thereof may suitably be used. The elastic covering layer may require to cover only the substantially entire area of the surface of the cylindrical metallic mass, and does not necessarily require to cover local portions of the metallic mass to which supporting members of the mold are fixed for supporting and positioning the metallic mass in the mold. The thickness of the elastic covering layer is determined to be held preferably within a range of 0.5–5 mm, more preferably within a range of 1–3 mm, in view of the fact that the elastic covering layer having an excessively small thickness may deteriorate its durability or its bonding strength to the cylindrical metallic mass, while the excessively large thickness of the elastic covering layer may lead to an undesirably increase in the size of the dynamic damper.

In the dynamic damper constructed according to the present invention, the configuration and structure of the elastic support member are not particularly limited, but may suitably be determined taking into account the required vibration damping characteristics, so as to elastically support the cylindrical metallic mass with respect to the oscillating rod member. For instance, the elastic support member may comprise a pair of cylindrical connecting portions each extending axially outwards and radially inward from axially opposite sides of the metallic mass. These cylindrical connecting portions are adapted to elastically connect the metallic mass for connection thereof with the oscillating rod-member. The dynamic damper whose elastic support member constructed as described above makes it possible to reduce the ratio of its spring value as measured in the axial direction to its spring value as measured in the tortional or radial direction perpendicular to the axial direction, resulting in a reduction in the outside diameter of the dynamic damper.

Alternatively, the elastic support member comprises a central connecting portion extending radially inward from an axially intermediate portion of the metallic mass over an radial spacing between said cylindrical metallic mass and said oscillating member. This central connecting portion is adapted to elastically connect the cylindrical metallic mass for connection thereof with the oscillating rod member. The dynamic damper whose elastic support member including the central connecting portion makes it possible to increase the ratio of its spring value as measured in the torsional or axial direction to the spring value as measured in the radial direction perpendicular to the axial direction, resulting in a reduction in the axial length of the dynamic damper. It may be possible that the elastic support member comprises both of the pair of the cylindrical connecting portion and the central connecting portion.

The above-described second object of the invention may be attained according to a second aspect of the present invention which provides a method of producing a dynamic damper according to a first aspect of the invention, comprising the steps of: disposing the cylindrical metallic mass in a mold cavity of a mold for molding the elastic support member and the elastic covering layer; positioning the cylindrical metallic mass within the mold cavity such that the cylindrical metallic mass is supported at an outer circumferential surface thereof and at axially opposite end faces thereof with a plurality of supporting pins formed in respective portions of a molding surface defining the mold cavity so as to protrude into the mold cavity; pouring a rubber material into the mold cavity of the mold; and vulcanizing the rubber material filling the cavity for integrally forming the elastic support member and the elastic covering layer.

According to the above indicated method of the present invention, the cylindrical metallic mass can be positioned at a predetermined position within the mold cavity of the mold by means of the plurality of supporting pins such that the supporting pins are in contact with the respective portions of the circumferential surface and the axially opposite end faces of the cylindrical metallic mass with a reduced contact area, effectively reducing the area of the metallic mass member which is not covered by the elastic covering layer, ensuring an improved bonding strength of the metallic mass with respect to the elastic support member.

In the present method, the mold is required, for effectively supporting the: cylindrical metallic mass within the mold, to have at least three supporting pins which are in contact with the outer circumferential surface of the metallic mass and which are spaced apart from each other in the circumferential direction thereof, and at least two supporting pins which are in contact with the opposite end faces of the metallic mass, respectively. More specifically described, the mold may be constructed such that a plurality of supporting pins each preferably having a tapered shape, are independently disposed at respective portions so as to protrude into toward the circumferential surface of the metallic mass and axially opposite end faces of the metallic mass. Alternatively, the mold may be formed with at least three "L" shape supporting pins disposed in the peripheral portion of each of the respective axially opposite end portions of the mold cavity, such that the "L" shape supporting pins are spaced apart from each other in the circumferential direction and protrude radially and axially inward directions from the peripheral portion of the corresponding axially opposite end portion of the mold cavity. Thus, the "L" shape supporting pins are held in contact at their radially inwardly extending portions with the corresponding end face of the metallic mass, and at their axially inwardly extending portions with the circumferential surface of the metallic mass, thereby supporting and positioning the metallic mass within the mold cavity. In this case, each of the radially inwardly and axially inwardly extending portions of each "L" shape supporting pin preferably extends with a semi-circular shape in transverse cross section, in other words, has a ridged shape in its entirety.

With the metallic mass installed within the mold constructed as described above, a suitable rubber material is poured into the mold cavity and vulcanized so as to integrally form the elastic covering layer and the elastic support member. In this respect, the metallic mass does not need to be subjected to the adhesive treatment, but may be subjected to washing or degreasing treatments, as needed.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
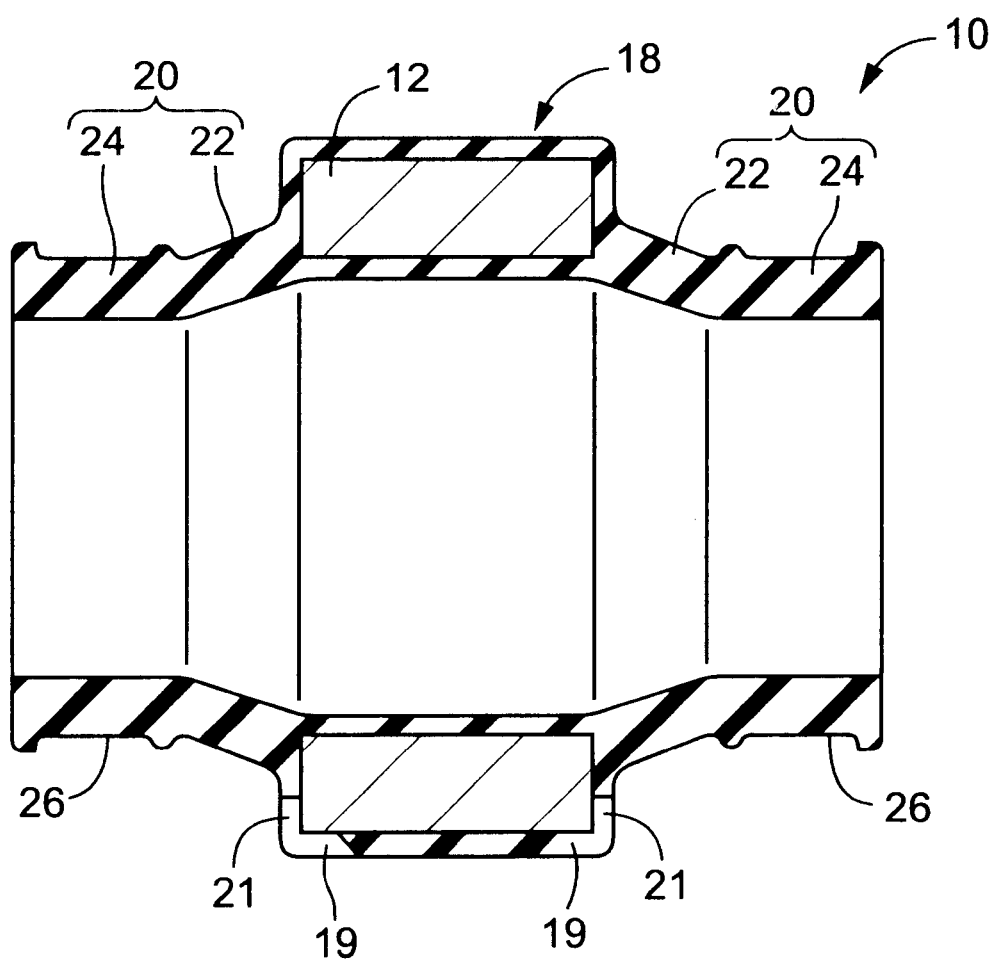
FIG. 1 is an elevational view in longitudinal cross section of a dynamic damper according to one embodiment of the present invention, taken along line 1—1 of FIG. 2.

Referring first to FIG. 1 showing a dynamic damper 10 according to the first embodiment of the present invention. The dynamic damper 10 has a generally cylindrical shape and includes a generally cylindrical metallic mass 12 and an elastic support member 14 secured to the metallic mass 12. The dynamic damper 10 is radially outwardly disposed on a drive shaft as an oscillating rod-member and fixed on the outer circumferential surface of the drive shaft at its elastic support member 14 so that the dynamic damper 10 exhibits an desired vibration damping effect with respect to vibrations in a radial direction perpendicular to an axial direction and a torsional or circumferential direction of the drive shaft.

More specifically described, the metallic mass 12 is a thick-walled cylindrical member made of carbon steel by hot forging. Such a cylindrical metallic mass 12 may be formed by closed die forging such that a disk-shaped blank previously heated is placed within a cylindrical cavity of a die and the central portion of the blank is punched out so as to form a bore thereof, or alternatively such that an annular-shaped blank previously heated is placed within the cylindrical cavity of the die and the central portion of the blank is punched so as to expand the bore thereof, for example. According to a general forging process, the thus formed metallic mass 12 is cooled in the process of a direct thermal refining from forging temperature wherein the metallic mass 12 is cooled under a suitable temperature control, or in an asforged process wherein the metallic mass 12 is exposed to the atmosphere with no temperature control. In both cases, the cooled metallic mass 12 is subjected to a treatment for removing a scale formed thereon (hereinafter referred to as a "scale removal treatment") during the cooling method as indicated above, thereby obtaining the desired metallic mass 12 whose scale is removed.

In general, the scale removal treatment as indicated above is performed on the forgings for the purpose of removing or cleaning the scale, i.e., a thin layer of oxides formed or deposited on the surface of the forgings. The scale removal treatment may be executed according to a suitable method such as a shot blasting wherein a stream of shots consisting of steel shots or wire-cuts which are accelerated by the air pressure or a circulation force, is applied or collided to the entire surface of the forging member. By executing the shot blasting, the oxides layer of the metallic mass 12 is completely removed from the substantially entire surface of the metallic mass 12, and the resultant entire surface of the metallic mass 12 is effectively roughed or rugged. Preferably, the metallic mass 12 has a surface roughness ranging from 30 μm to 200 μm as measured ten-point means roughness Rz scale.

To the surface of the metallic mass 12 there is secured a rubber layer 18 such that the rubber layer 18 is fixed in close contact with the surface of the metallic mass 12. This rubber layer 18 in the form of an elastic covering layer is adapted to cover the entire area of the surface of the metallic mass 12 with a substantially constant thickness, preferably 0.5–5 mm, more preferably 1–3 mm. The elastic support member 14 is integrally formed with the rubber layer 18, on axially opposite sides of the metallic mass 12. The elastic support member 14 includes a pair of elastic support portions 20, 20 which are formed so as to extend over a suitable axial length from the respective axially opposite ends of the metallic mass 12. Each of the elastic support portions 20 has a tapering portion 22 which extend axially outwards and radially inwards from the corresponding axial end of the metallic mass 12 and a cylindrical fixing portion 24 which extends axially outward from the tapering portion 22 with a substantially constant inner and outer diameters. Each of the cylindrical fixing portions 24 has an annular groove 26 formed in its outer circumferential surface. The annular groove 26 is adapted to receive a retainer band (not shown).

The dynamic damper 10 constructed as described above, is installed on a drive shaft (not shown) such that the dynamic damper 10 is radially outwardly disposed of the drive shaft, i.e., surrounds the drive shaft. In the dynamic damper 10 of the present embodiment, the inside diameter of the fixing portions 24 is made slightly smaller than the outside diameter of the drive shaft and the dynamic damper 10 is firmly fixed on the drive shaft such that the inner circumferential surface of the fixing portions 24 is forcedly fixed in close contact with the respective portions of the outer circumferential surface of the drive shaft, based on elasticity of the fixing portions 24. The retainer bands (not shown) made of a hard material such as a metal may be fixedly received in the respective annular grooves 26, as needed, so that the fixing portions 24 are further firmly fixed to the respective portions of the drive shaft such that the fixing portions 24 are immovable in the axial and circumferential direction of the drive shaft.

In the dynamic damper installed on the drive shaft as described above, the metallic mass 12 is coaxial with and radially outwardly disposed of (i.e., surrounds) the drive shaft with a given axial spacing, while being elastically supported by the elastic support portions 20, 20, to thereby constitute a secondary vibration system with respect to a primary vibration system as of the drive shaft, in order to absorb or reduce the vibration of the drive shaft. Meanwhile the dynamic damper 10 is arranged to have a reduced ratio of its spring value as measured in the axial direction to the spring value as measured in the radial or torsional direction, leading to a reduction in the diametrical length of the dynamic damper 10.

In the dynamic damper 10 constructed as described above, the metallic mass 12, the elastic support member 14 and the elastic covering layer 18 are formed into an integral vulcanized elastic body product, wherein the elastic support member 14 and the elastic covering layer 18 constitute an integral elastic body, and are secured to the metallic mass embedded therein.

Figure 4:
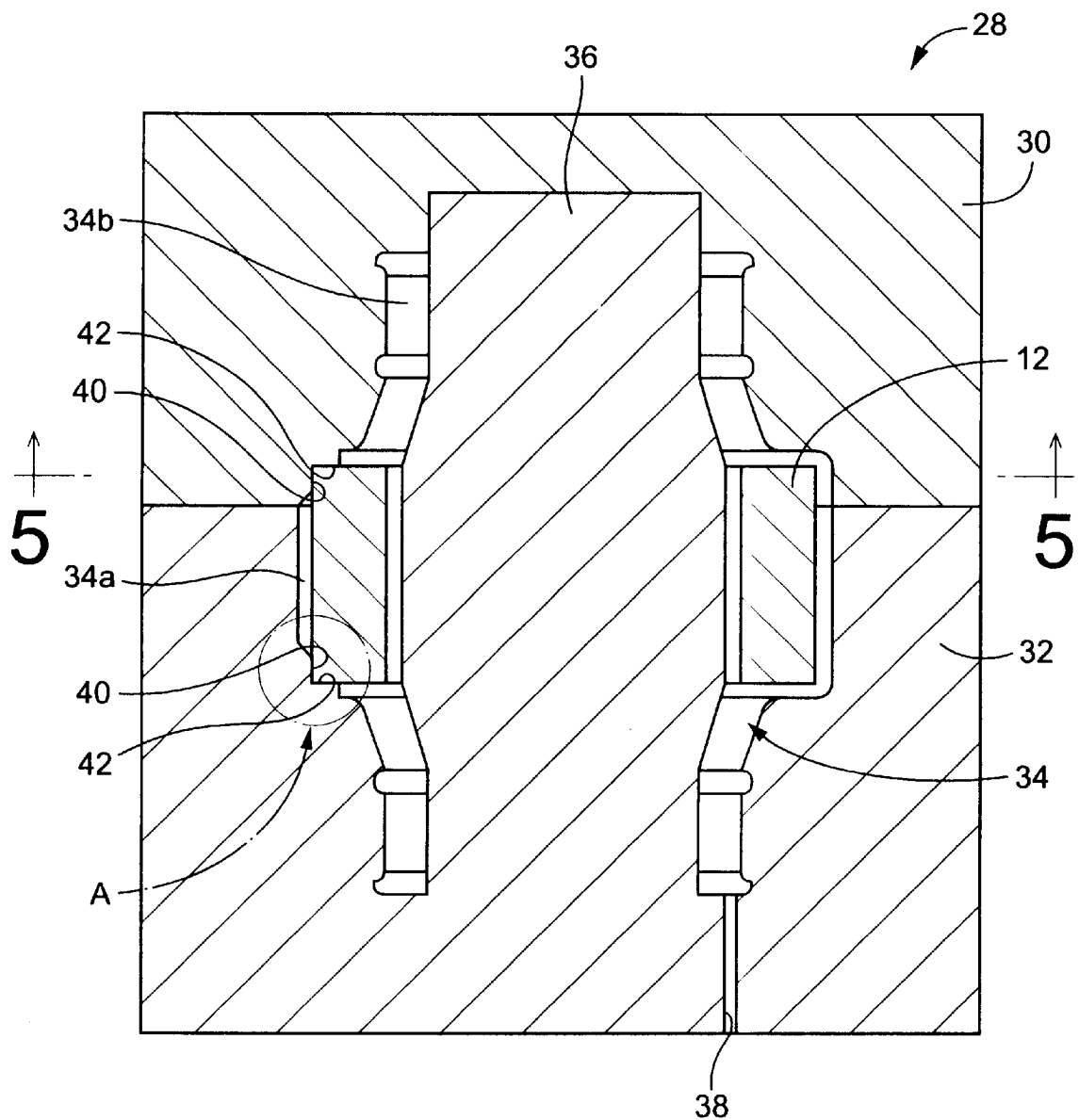
FIG. 4 is an enlarged fragmentally view in longitudinal cross-section of a mold used for molding the dynamic damper of FIG. 1.
Figure 5:
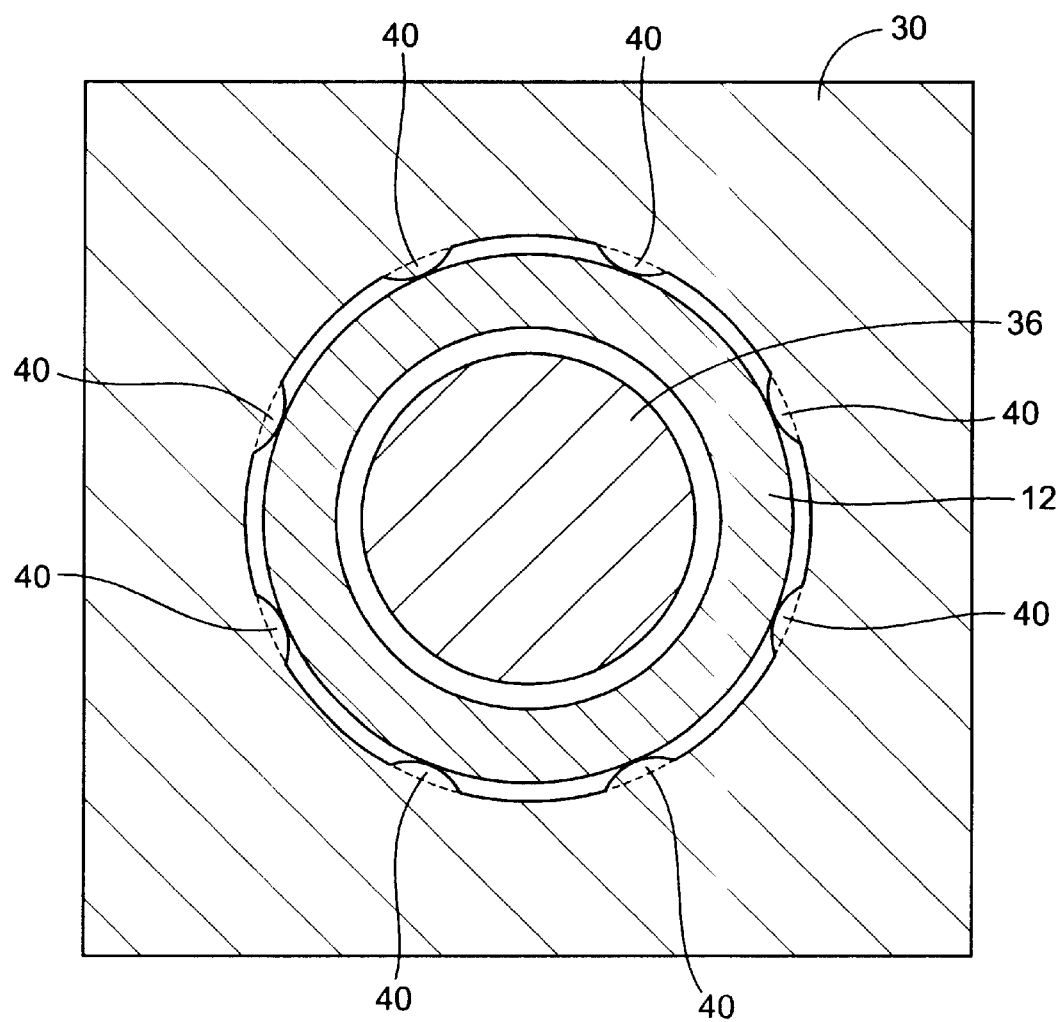
FIG. 5 is a cross sectional view in taken along line of 5—5 of FIG. 4.

Referring next to FIGS. 4 and 5, there are shown a mold 28 having a mold cavity 34, the configuration of which corresponds to that of the desired rubber layer 18 and the elastic support member 14. With the metallic mass 12 disposed within the mold cavity 34, as shown in FIGS. 4 and 5, a suitable rubber material is poured into the mold cavity of the mold 28 and is then vulcanized, thereby effectively providing the elastic covering layer 18 and the elastic support member 14.

Described in detail, the mold 28 includes an upper mold half 30 and a lower mold half 32 which are butted together at a parting plane extending in the direction perpendicular to the longitudinal direction, to thereby define therebetween the mold cavity 34. The mold cavity 34 includes a first cavity portion 34*a* the configuration of which corresponds to that of the desired the rubber layer 18 and a second cavity portion 34*b* the configuration of which corresponds to that of the desired elastic support portions 20, 20. The first and second cavity portions cooperate with each other to constitute the single mold cavity 34.

The lower mold half 32 has a cavity open in the upper end face at which the lower mold half 32 is butted to the upper mold half 30. The central portion of the bottom surface of the cavity of the lower mold half 32 protrudes in the axially upward direction so as to form a core portion 36. The core portion 36 has the outer circumferential surface which provides a molding surface corresponding to the inner surface of the rubber layer 18 and the elastic support member 14. The lower mold half 32 further includes a through hole 38 served as a gate through which the suitable rubber material is poured or injected into the mold cavity 34.

Figure 6:
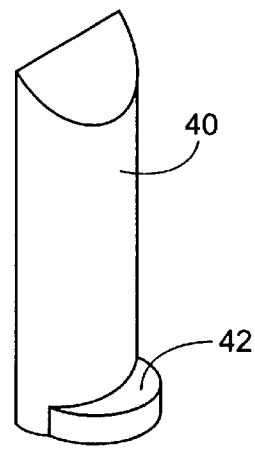
FIG. 6 is an enlarged view of supporting members formed in section A of FIG. 4.

Upon forming the rubber layer 18 and the elastic support member 14 in the mold 28, the metallic mass 12 is required to be placed in the first cavity portion 34*a* such that the metallic mass 12 is located at a radial central portion of the cavity portion 34*a*, while being held in co-axial relationship with the first cavity portion 34*a*. To this end, the molding surface defining the first cavity portion 34*a* includes a plurality of supporting protrusions 40 at its axially opposite end portions. In the present embodiment, eight supporting protrusions 40 are formed at each axial end portion of the first cavity portion 34*a*, such that the eight supporting protrusions 40 are spaced apart from each other in the circumferential direction at substantially constant intervals and each supporting protrusion 40 protrudes in the radially inward direction with a given radial dimension. As is apparent from FIG. 5, the outer circumferential surface of the metallic mass 12 is held in contact with the supporting portions 40 at its axially opposite end portions, so that the metallic mass 12 is effectively positioned in the first mold cavity portion 34*a* in the diametrical direction. At each of the axially opposite end portions of the first mold cavity 34*a*, two pairs of adjacent ones of the supporting protrusions 40, 40, 40, 40, 40, which pairs being diametrically opposite to each other, are arranged to be formed with semi-circular protrusions 42 as shown in FIG. 6. Each of the semi-circular protrusions 42 is integrally formed in the axially-outward end portion of the corresponding supporting protrusion 40 so as to protrude radially inwardly from the outer circumferential surface of the supporting protrusion 40. In this arrangement, the axially opposite end faces of the metallic mass 12 are held in abutting contact with the semi-circular protrusions 42 which are formed at respective axially opposite end face of the first mold cavity 34a, so that the metallic mass 12 is effectively positioned in the first mold cavity 34a in the axial direction. In the above-indicated molding operation, the metallic mass 12 may be previously subjected to suitable washing and degreasing treatments, as needed.

Figure 2:
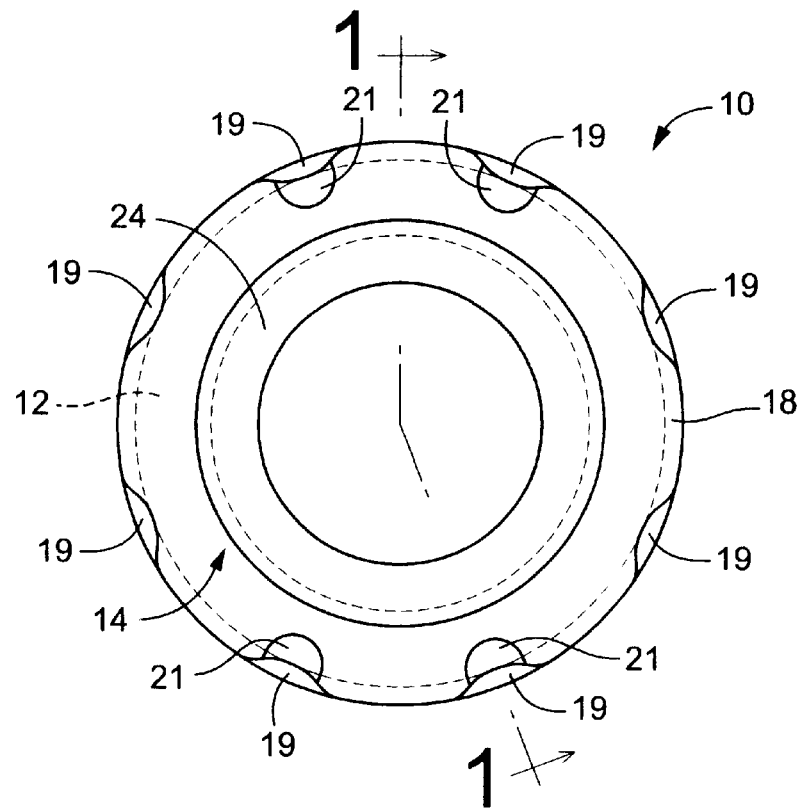
FIG. 2 is a right plane view of the dynamic damper of FIG. 1.
Figure 3:
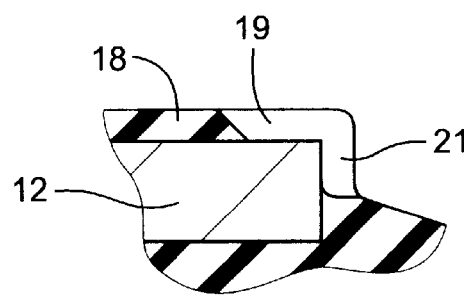
FIG. 3 is an enlarged fragmentally view in longitudinal cross-section of the dynamic damper of FIG. 1.

As is apparent from FIGS. 5 and 6, each supporting protrusion 40 has a tapered shape such that the width or the circumferential length of supporting protrusion 40 is decreased as the supporting protrusions 40 protrude radially inwardly, so that the supporting portions extend in the axial direction of the first mold cavity portion 34a with a generally semi-circular shape in traverse cross section. This arrangement makes it possible to effectively reduce the required surface area of the supporting protrusions for contact with the outer circumferential surface of the metallic mass 12 in order to support and position the metallic mass 12 in the first mold cavity portions 34a, making it possible for the substantially entire area of the surface of the metallic mass 12 to be effectively covered with the rubber layer 18. Described in detail, the metallic mass 12 is substantially entirely covered with the rubber layer 18 and partially exposed to the atmosphere at respective portions corresponding to the supporting protrusions 40, as shown in FIGS. 2 and 3. That is, the rubber layer 18 covering over the substantially entire area of the metallic mass 12 includes eight cutouts 19 formed in respective portions corresponding to supporting protrusions 40 at each of its axially opposite end portions of the metallic mass 12. The eight cutouts are spaced apart from each other in the circumferential direction at substantially constant intervals, while having a semi-circular shape in its transverse cross section. The rubber layer 18 further includes four cutouts 21 formed in respective portions corresponding to the semi-circular protrusions 42 at each of its axially opposite end faces of the metallic mass 12.

In the present dynamic damper 10 constructed as an integral vulcanized produce, the rubber layer 18 and the elastic support member 14 are integrally formed as a single elastic body wherein the metallic mass 12 is embedded and secured thereto in the vulcanizing process of a rubber material to form the rubber layer 18 and the support member 14. In other words, the metallic mass 12 is covered with the rubber layer 18 over its substantially entire area. In addition, the rubber layer 18 is firmly fitted in close contact with the surface of the metallic mass 12 owing to a filling pressure of the rubber material in the mold cavity 34 and shrinkage of the rubber material in the vulcanization process.

In particular, the metallic mass 12 is formed by the hot-forging of the metallic material in the present embodiment, so that the surface of the metallic mass 12 is effectively rugged as a result of the shot blasting or the like. One of opposite surface of the rubber layer 18 which is contact with the rugged surface of the metallic mass 12 is accordingly made rugged along with the rugged surface of the metallic mass 12, upon vulcanization of the rubber material to form the rubber layer 18. In this arrangement, the rugged surface of the metallic mass 12 and the surface of the rubber layer 18 are mechanically engaged with their raised and recessed portions engaged with each other, as seen in a microscopic level.

Accordingly, the present dynamic damper 10 constructed as described above can eliminate an adhesive treatment for the metallic mass 12 upon vulcanizing the rubber material for forming the rubber layer 18 and the elastic support member 14, while ensuring a sufficiently increased bonding strength between the metallic mass 12 and the rubber layer 18. In addition, the elimination of the adhesive treatment for the metallic mass 12 is effective to reduce the manufacturing cost of the dynamic damper 10, leading to an improved efficiency of the manufacture.

The thus constructed dynamic damper 10 can exhibit an improved stability with respect to a significantly large input vibrational load and an improved durability, so that the dynamic damper 10 is capable of exhibiting an excellent damping effect with high stability. For instance, the rubber layer 18 and the metallic mass 12 are firmly secured to each other, even when an excessively large vibrational load is applied to the dynamic damper in the direction perpendicular to the axial direction, or when a primary load in the axial direction upon installation of the dynamic damper 10 and an impact load in the axial direction upon collision small pieces of rocks with the dynamic damper 10 are applied to the dynamic damper 10. Since the bonding stability between the rubber layer 18 and the metallic mass 12 is effectively improved in the present embodiment, the dynamic damper is capable of eliminating the conventionally experienced problems such as the undesirable displacement of the rubber layer 18 and the metallic mass 12 relative to each other at the interface therebetween, and the undesirable introduction of the air into the interface between of the rubber layer 18 and the metallic mass 12, resulting in an desirable vibration damping effect with high stability.

Further, the use of the metallic mass 12 formed by forging assures an excellent dimensional accuracy of the metallic mass 12, and permits a high-precise determination of the mass of the metallic mass 12. This arrangement assures a desired vibration damping effect with high stability.

Figure 7:
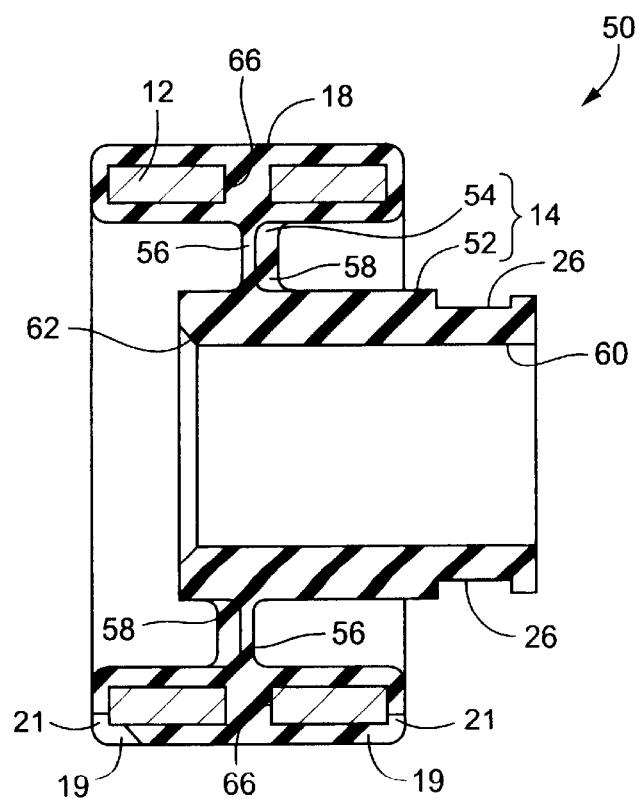
FIG. 7 is an elevational view in longitudinal cross section of a dynamic damper according to another embodiment of the present invention, taken along line 7—7 of FIG. 8.
Figure 8:
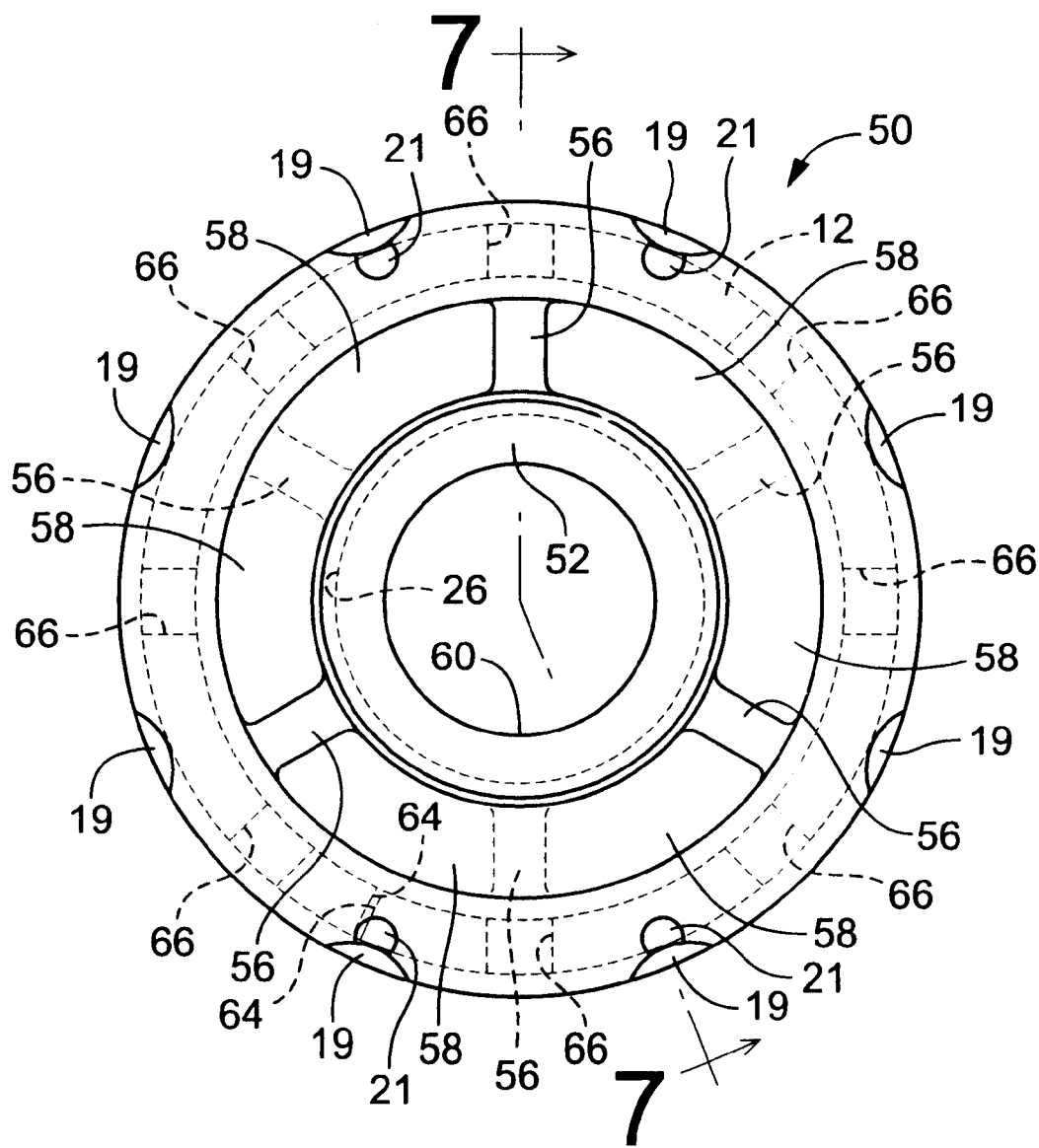
FIG. 8 is a right plane view of the dynamic damper of FIG. 7.

Referring next to FIGS. 7 and 8, there is illustrated a dynamic damper 50 constructed according to the second embodiment of the present invention. In the second embodiment, the reference numerals used in the preceding embodiment will be used to identify the corresponding elements, and no description of these elements will be provided.

The dynamic damper 50 is equipped with a drive shaft of a FF (front-engine/front-drive) automotive vehicle, and functions as a vibration damper for absorbing or attenuating bending (radial) and circumferential vibrations of the drive shaft. Like the first embodiment, the dynamic damper 50 comprises the metallic mass 12 radially outwardly disposed of the drive shaft and the elastic support member 14 by which the metallic mass 12 is elastically supported on the drive shaft.

The elastic support member 14 includes a boss portion 52 in the form of a generally cylindrical member as a cylindrical fixing portion, which has a relatively-small diameter, and a plurality of connecting portions 54 extending radially outward direction. The boss portion 52 is coaxial with and radially inwardly disposed of the metallic mass 12 with a given radial spacing therebetween. Namely, the outer circumferential surface of the boss portion 52 and the inner circumferential surface of the rubber layer 18 which covers the inner circumferential surface of the metallic mass 12 are opposed to each other in the radial direction with the given radial spacing therebetween. The plurality of connecting portions 54 (six connecting portions in this embodiment) are disposed between the boss portion 52 and the rubber layer 18 such that the connecting portions 54 extend in the radial direction over the radial spacing between the boss portion 52 and the rubber layer 18, while being spaced apart from each other in the circumferential direction at regular intervals.

Each of the connecting portions 54 consists of an elastic body integrally formed with the boss portion 52 and the rubber layer 18, whereby the metallic mass 12 is elastically connected to the boss portion 52.

Described in detail, the six connecting portions 54 consists of the six ribs 56 extending straightly in the radial direction and six of this-walled connecting plates 58 extending over the circumferentially adjacent ones of the ribs 56 so as to close opening defined between the adjacent ones of the ribs 56. Namely, the connecting plates 58 extend in the circumferential direction in an axially central portion of the metallic mass 12, such that the six connecting plates 58 alternately protrude in the axially opposite directions. The thus constructed connecting portions 54 are effective to provide an excellent balance of motion of the metallic mass 12 about a center axis of the dynamic damper 50.

Like the fixing portion 24 of the dynamic damper 10 of the first embodiment, the boss portion 52 is arranged to have an inside diameter slightly smaller than the outside diameter of the drive shaft to which the dynamic damper 50 is equipped. In this arrangement, the dynamic damper 50 is installed on the drive shaft by forcedly inserting the drive shaft into the bore 60 of the boss portion 52 of the dynamic damper 50, so that the inner circumferential surface of the boss portion 52 is fitted in close contact with the outer circumferential surface of the drive shaft based on the elasticity of the boss portion 52. For facilitating the above-indicated insertion of the drive shaft into the bore 60 of the boss portion 52, one of axially opposite ends of the boss portion 52 (the left-hand end as seen in FIG. 7) has a tapered surface 62 at its inner peripheral portion, such that the tapered surface 62 extends axially outwards and radially outward toward the axially opposite end. In the vicinity of the other end of the boss portion 52 (the right-hand end as seen in FIG. 7), the circumferential groove 26 is formed so as to be open in the outer circumferential surface of the boss portion 52.

The metallic mass 12 disposed radially outwardly of the boss portion 52 is a generally cylindrical member having a relatively large diameter and an axial length smaller than that of the boss portion 52. The metallic mass 12 is disposed on the side of the left-hand axial end of the boss portion 52 so as not to be located radially outward of the circumferential groove 26. This arrangement facilitates mounting the fastening belt on the groove 26.

The thus constructed dynamic damper 50 is installed on and fixed to the drive shaft such that the boss portion 52 is forcedly fitted in close contact with the outer circumferential surface of the drive shaft. In this condition, the metallic mass 12 is elastically supported by the elastic support member 14 with respect to the drive shaft. Thus, the drive shaft serves as a primary vibration system, while the metallic mass 12 serves as a secondary vibration system. The mass of the metallic mass 12 and the spring constant of the elastic support member 14 are suitably adjusted so that the dynamic damper 50 is tuned to exhibit a desired vibration damping effect with respect to the vibration having a specific frequency band.

Figure 9:
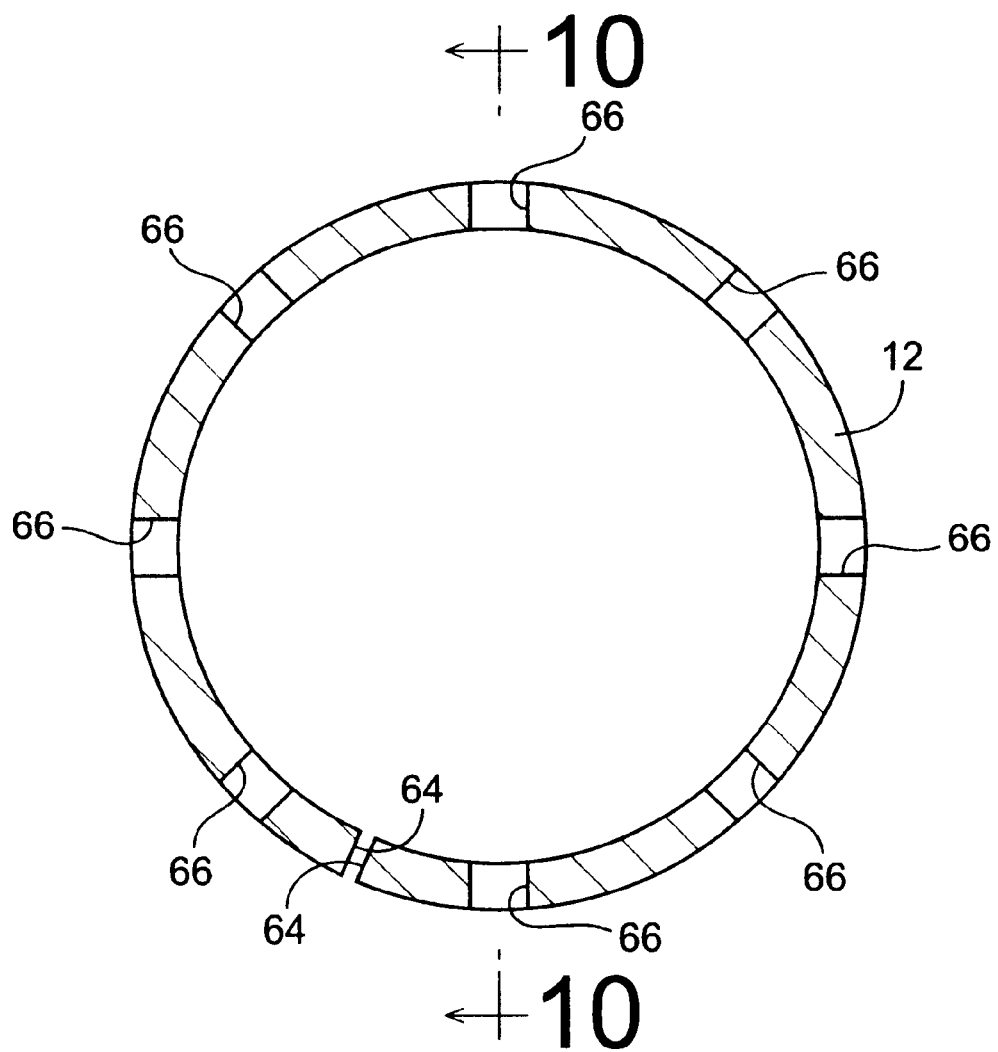
FIG. 9 is a transverse cross sectional view of a metallic mass member of the dynamic damper of FIG. 7.
Figure 10:
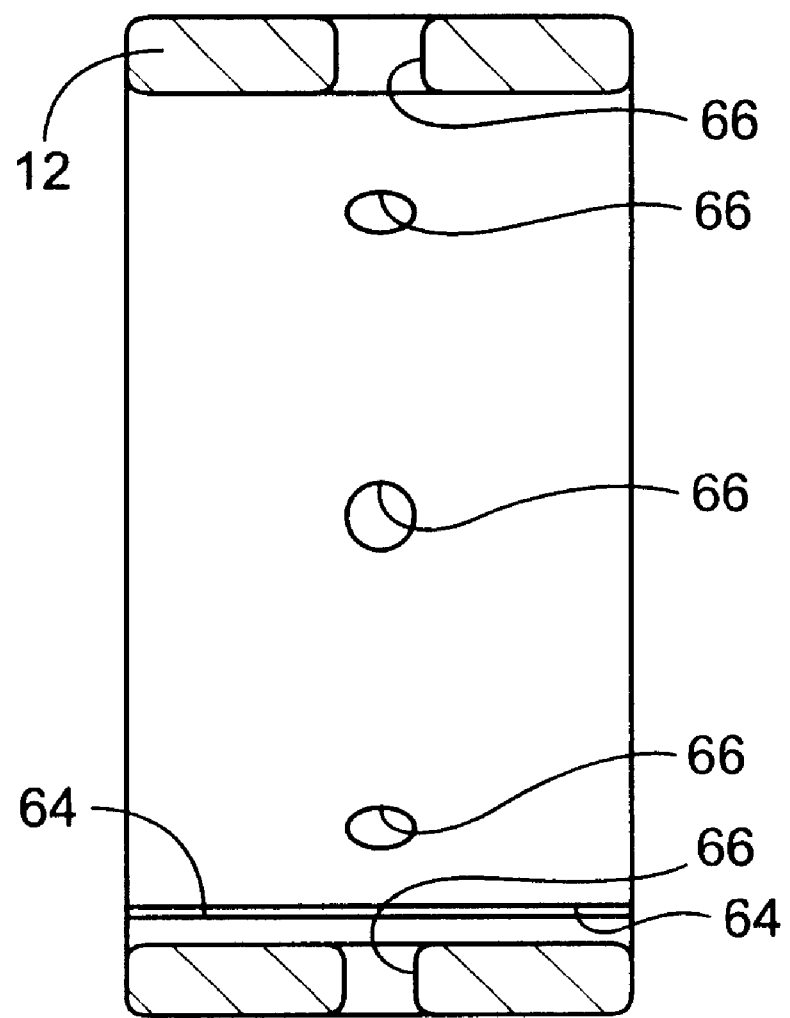
FIG. 10 is a cross sectional view in taken along a line of 10—10 of FIG. 9.

As is apparent from FIGS. 9 and 10, the metallic mass 12 of the present embodiment may be formed of a plane metallic plate by roll molding such that the plane metallic plate is rounded at a constant curvature. The circumferential opposite end faces 64, 64 of the rounded metallic plate are opposed to each other in the circumferential direction with a slight circumferential distance therebetween, without being butted and connected together. The thus constructed metallic mass 12 has a plurality of through holes 66 (eight holes in the present embodiment) which are spaced apart from each other in the circumferential direction at substantially constant intervals, and extend therethrough in the diametric direction.

Meanwhile, the plane metallic plate used for forming the metallic mass 12 may be preferably formed of a hot- or cold-rolled steel plate by die stamping. For instance, a steel plate formed by a progressive press is preferably employed, taken into account its high productivity The metallic plate thus obtained is subjected to a known roll molding method such as pressing with a rounding dies, drawing and roll bending, so that the metallic plate is rounded in its longitudinal direction at the substantially constant curvature, thereby providing the desired cylindrical metallic mass 12.

The thus obtained metallic mass 12 is further subjected to an annealing operation in order to remove a residual stress in the metallic mass 12 generated in the above-indicated molding process. After the annealing operation, the metallic mass 12 is subjected to the scale removal operation, such as shot blasting, whereby the surface of the metallic mass 12 is effectively rugged by the shot blasting, as in the first embodiment. Described in detail, the surface of the metallic mass 12 is preferably arranged to have a ten point mean roughness Rz in a range from 30 $\mu$m to 200 $\mu$m.

Further, the metallic mass 12 is covered with the rubber layer 18 over the substantially entire area thereof. The rubber layer 18 is formed with a generally constant thickness and fixed in close contact with the surface of the metallic mass 12, without using an adhesive interposed therebetween. The gap interposed between the opposed circumferential end faces 64, 64 and the through holes 66 is filled with the rubber layer 18. With the through holes 66 being filled with the rubber layer 18, the outer circumferential portion of the rubber layer 18 which covers the outer circumferential surface of the metallic mass 12 and the inner circumferential portion of the rubber layer 18 which covers the inner circumferential surface of the metallic mass 12 are integrally connected via the rubber layer 18 filling the through holes 66. This arrangement is effectively to firmly secure the entire of the rubber layer 18 to the metallic mass 12.

That is, the boss portion 52, the rubber layer 18 and the connecting portions 54 are formed as an integrally vulcanized elastic body product. The metallic mass 12 is embedded in the elastic body, upon vulcanization of the rubber material to form the boss portion 52, the rubber layer 18 and the connecting portions 54.

Figure 11:
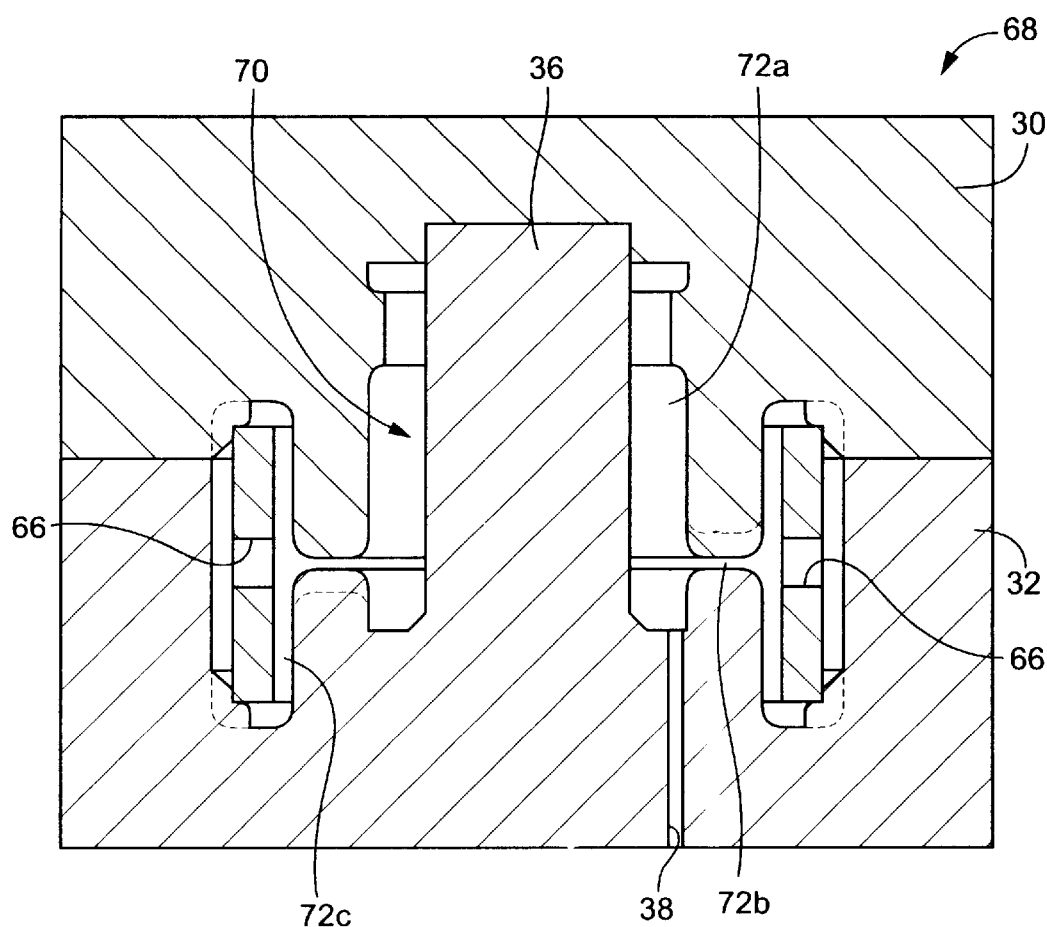
FIG. 11 is an elevational view in longitudinal cross section of a mold used for molding the dynamic damper of FIG. 7.

The above-indicated vulcanization of the rubber material is effectively performed by using a mold 68 as illustrated in FIG. 11. The mold 68 includes an upper mold half 30 and a second mold half 32 which are butted together at a parting plane extending in the direction perpendicular to the axial direction of the mold 68, to thereby define therebetween the mold cavity 70 whose configuration corresponds to that of the elastic body, i.e., the boss portion 54, the rubber layer 18 and the connecting portions 56. With the metallic mass 12 being placed in a suitable position of the mold cavity 70, a suitable rubber material is poured into the mold cavity 70 through the through hole 38 served as a gate. The rubber material filling the mold cavity 70 is then vulcanized according to a known vulcanizing process, thereby providing the desired integrally vulcanized elastic body product consisting of the boss portion 54, the rubber layer 18 and the connecting portions 56. In this respect, the mold cavity 70 includes a first cavity portion 72a served for forming the boss portion 52, and a second cavity portion 72b served for forming the connecting portions 54 and a third cavity portion 72c served for forming the rubber layer 18. The first, second and third cavity portions cooperate with each other to constitute the single mold cavity 70.

Upon molding the elastic body by using the mold 68, the metallic mass 12 is required to be suitably located in the central portion of the third cavity portion 72c such that the metallic mass 12 is coaxial with the mold cavity 70. To this end, the molding surface defining the third mold cavity 72c includes at least three supporting protrusions 54 (eight protrusions in this embodiment) at each of the axially opposite ends of the third cavity portion 72c. More specifically, the eight supporting protrusions 54 formed in an outer peripheral portion of the corresponding axial end of the third cavity portion 72c such that the supporting protrusions 54 protrude radially inwardly from the molding surface of the third cavity portion 72c, while being spaced apart from each other in the circumferential direction at regular intervals. The outer circumferential surface of the metallic mass 12 is held in contact with the supporting protrusions 40 at its axially opposite end portions, so that the metallic mass 12 is effectively positioned in the third cavity portion 72c in the diametrical direction. As in the first embodiment, two pairs of adjacent ones of the supporting protrusions 40, 40, 40, 40 that pairs are diametrically opposite to each other are arranged to have the semi-circular protrusions 42, respectively, which are formed in their axially outward end portions, so as to extend radially inwardly from the circumferential surfaces of the supporting protrusions 40, respectively. In this arrangement the axially opposite end faces of the metallic mass 12 are held in abutting contact with the semi-circular protrusions 42 which are formed at respective axially opposite ends of the third cavity portion 72c, so that the metallic mass 12 is effectively positioned in the third cavity portion 72c in the axial direction. Thus, the metallic mass 12 is effectively held in the generally central position of the third cavity portions 72c. As discussed above with respect to the dynamic damper 10 of the first embodiment, the supporting protrusions 40 have the tapered shape, so that the supporting protrusions 40 are contact with the metallic mass 12 with a reduced contact area, for supporting the metallic mass 12 in the third mold cavity 72c, leading to the advantages of the present invention similar to the first embodiment.

In the thus obtained dynamic damper 50 as an integral vulcanized product, the rubber layer 18, the boss portion 52 and the connecting portions 54 are formed as a single elastic body, and the metallic mass 12 is embedded within the elastic body upon vulcanization of the rubber material for forming the rubber layer 18, the boss portion 52 and the connecting portions 54. In this arrangement, the generally entire surface of the metallic mass 12 is effectively covered with the rubber layer 18. In addition, the rubber layer 18 is firmly fitted in close contact with the surface of the metallic mass 12 owing to a filling pressure of the rubber material in the mold cavity 34 and shrinkage of the rubber material upon vulcanization thereof. Moreover, the entire surface of the metallic mass 12 is effectively rugged by the scale removal treatment, while one of opposite surface of the rubber layer which is in contact with the rugged surface of the metallic mass 12 is accordingly made rugged along with the rugged surface of the metallic mass 12, upon vulcanization of the rubber material to form the rubber layer 18, whereby the metallic mass 12 and the rubber layer 18 are mechanically engaged with their raised and recessed portions engaged with each other, resulting in a sufficiently increased bonding stability between the metallic mass 12 and the rubber layer 18. Thus, the dynamic damper 50 is capable of exhibiting the advantages similar to the first embodiment.

The dynamic damper 50 constructed according to the present embodiment makes it possible to increase the ratio of its spring value as measured in the radial direction perpendicular to the axial direction to its spring value as measured in the axial or tortional direction, while making it possible to reduce its axial length.

While the present invention has been described in detail in its presently preferred embodiments, for illustrative purpose only, it is to be understood that the invention is by no means limited to the details of the illustrated embodiments, but may be otherwise embodied.

For instance, the drive shaft may be arranged to have a large-diameter portion and a small-diameter portion which are cooperate to form a stepped portion. The provision of the stepped portion of the drive shaft may facilitate positioning of the dynamic damper with respect to the drive shaft.

While the plurality of through holes are formed in the metallic mass 12 of the second embodiment in order to improve the bonding strength between tile rubber layer 18 and the metallic mass 12 it may be possible to form at least one cutout in the axial ends of the metallic mass 12 for the same purpose, instead of or in addition to the through holes. Moreover, the sizes or positions of the through holes or the cutout(s) in the metallic mass may be suitably adjusted so that the metallic mass has a desired weight balance.

The structure of the mold for molding the dynamic damper is not particularly limited, provided that the mass member is positioned and supported by means of the plurality of supporting pins.

The principle of the present invention is also applicable to a double mass-type dynamic damper wherein two cylindrical mass members are disposed in series in the axial direction with a given axial spacing therebetween, and elastic support members are secured to axially opposite end faces of the respective cylindrical mass members and connected to each other in the axial direction.

It is also to be understood that the present invention may be embodied with various other changes, modifications and improvements which may occur to those skilled in the art, without departing from the spirit and scope of the invention defined in the following claims.

What is claimed is:

1. A dynamic damper for mounting on a rod-shaped oscillating member, comprising:

generally cylindrical mass member adapted to be disposed radially outwardly of the oscillating member and comprising a forged cylindrical metallic mass subjected to a scale-removal treatment to provide the surface of the cylindrical mass with a ten-point mean surface roughness Rz in a range of 30 $\mu$m to 200 $\mu$m;

an elastic support member elastically supporting said cylindrical metallic mass for connection thereof with the oscillating member; and an elastic covering layer covering substantially an entire surface area of said cylindrical metallic mass and integrally formed with said elastic support member, wherein said elastic covering layer is fixed in close contact with substantially the entire surface area of said cylindrical metallic mass without using an adhesive.

2. A dynamic damper according to claim 1, wherein said surface of said metallic mass has a ten-point mean roughness Rz in a range from 50 $\mu$m to 100 $\mu$m.

3. A dynamic damper according to claim 1, wherein said forged cylindrical metallic mass is hot forged cylindrical metallic mass.

4. A dynamic damper according to claim 1, wherein said elastic support member comprises a pair of cylindrical connecting portions extending axially outwardly and radially inwardly from axially opposite sides of said cylindrical metallic mass, said pair of cylindrical connecting portions being adapted to elastically connect said cylindrical metallic mass to the oscillating member.

5. A dynamic damper according to claim 4, wherein said cylindrical connecting portions include respective tapering portions which extend axially outwardly and radially inwardly from said respective axial sides of said metallic mass and which have an inner diameter larger than the outer diameter of said oscillating member, and respective cylindrical fixing portions which extend axially outwardly from said respective tapering portions and which has an inner diameter slightly smaller than the outer diameter of said oscillating member, said cylindrical fixing portions being adapted to be held in abutting contact with respective outer circumferential surfaces of axial portions of said oscillating member.

6. A dynamic damper according to claim 1, wherein said elastic support member further includes a central connecting portion extending radially inwardly from an axially central portion of said cylindrical metallic mass to radially space said cylindrical metallic mass from said central connecting portion, which is adapted to elastically connect said metallic mass to the oscillating member.

7. A dynamic damper according to claim 6, wherein said central connecting portion includes an integral cylindrical fixing portion having an inner diameter slightly smaller than the outer diameter of said oscillating member and adapted to be held in abutting contact with an outer circumferential surface of said oscillating member.

8. A dynamic damper according to claim 1, wherein said elastic covering layer has a thickness in a range of 0.5–5 mm.

9. A dynamic damper according to claim 1, wherein the elastic covering layer is composed of rubber and it is vulcanized directly onto the cylindrical metallic mass without the use of an adhesive treatment.

* * * * *